US00RE43177E

(19) United States
(12) Reissued Patent
Paik et al.

(10) Patent Number: US RE43,177 E
(45) Date of Reissued Patent: Feb. 14, 2012

(54) APPARATUS AND METHOD FOR PREVENTING AN ELECTRICAL BACKFEED

(75) Inventors: Namwook Paik, Acton, MA (US); James Donalds, Lunenburg, MA (US); Emanuel Landsman, Lexington, MA (US); Vishwas Deokar, Acton, MA (US); Fred Rodenhiser, Wilmington, MA (US); Stephen G. Williams, Baltimore, MD (US)

(73) Assignee: American Power Conversion Corporation, West Kingston, RI (US)

(21) Appl. No.: 12/761,895

(22) Filed: Apr. 16, 2010

Related U.S. Patent Documents

Reissue of:
(64) Patent No.: 7,446,437
Issued: Nov. 4, 2008
Appl. No.: 11/187,657
Filed: Jul. 22, 2005

(51) Int. Cl.
*H01H 83/00* (2006.01)
*H01H 79/00* (2006.01)
*H02J 4/00* (2006.01)

(52) U.S. Cl. ..... 307/115; 307/64

(58) Field of Classification Search ..... 307/115, 307/64

See application file for complete search history.

(56) References Cited

U.S. PATENT DOCUMENTS

| | | | | |
|---|---|---|---|---|
| 3,705,280 | A | | 12/1972 | Harms |
| 4,231,029 | A | | 10/1980 | Johnston |
| 4,611,289 | A | | 9/1986 | Coppola |
| 4,674,031 | A | | 6/1987 | Siska, Jr. |
| 4,763,013 | A | | 8/1988 | Gvoth, Jr. et al. |
| 4,769,555 | A | | 9/1988 | Pequet et al. |
| 4,918,562 | A | | 4/1990 | Pulizzi et al. |
| 5,070,252 | A | * | 12/1991 | Castenschiold et al. ..... 307/64 |
| 5,081,367 | A | | 1/1992 | Smith et al. |
| 5,270,576 | A | | 12/1993 | Kahle |
| 5,424,903 | A | | 6/1995 | Schreiber |
| 5,450,334 | A | | 9/1995 | Pulizzi et al. |

(Continued)

FOREIGN PATENT DOCUMENTS

GB 516265 12/1939

OTHER PUBLICATIONS

MGE UPS Systems Brochure, "Galaxy 3000—Data Center Grade Power Protection for Critical Environments," Dec. 2001, 4 pps.

(Continued)

*Primary Examiner* — Jared J Fureman
*Assistant Examiner* — Adi Amrany
(74) *Attorney, Agent, or Firm* — Lando & Anastasi, LLP

(57) ABSTRACT

At least one aspect is directed to a transfer switch including a first input to couple a first multiphase low voltage electrical supply to the transfer switch, and a second input to couple a second multiphase low voltage electrical supply to the transfer switch. The transfer switch also includes a first set of switches in electrical communication with the first input and a second set of switches in electrical communication with the second input. A control module monitors and controls operation of both the first set of switches and the second set of switches to detect a malfunction of any switches included in at least one of the first set of switches and the second set of switches and prevent the first input from being placed in electrical communication with the second input.

55 Claims, 8 Drawing Sheets

U.S. PATENT DOCUMENTS

| | | | | |
|---|---|---|---|---|
| 5,462,225 | A | 10/1995 | Massara et al. | |
| 5,534,734 | A | 7/1996 | Pugh et al. | |
| 5,581,133 | A * | 12/1996 | Smith et al. | 307/64 |
| 5,646,459 | A | 7/1997 | Hatate et al. | |
| 5,721,934 | A | 2/1998 | Scheurich | |
| 5,739,594 | A * | 4/1998 | Sheppard et al. | 307/64 |
| 5,923,103 | A | 7/1999 | Pulizzi et al. | |
| 5,939,802 | A | 8/1999 | Hornbeck | |
| 6,011,327 | A | 1/2000 | Cook et al. | |
| 6,172,428 | B1 | 1/2001 | Jordan | |
| 6,172,432 | B1 | 1/2001 | Schnackenberg et al. | |
| 6,181,028 | B1 | 1/2001 | Kern et al. | |
| 6,330,176 | B1 | 12/2001 | Thrap et al. | |
| 6,570,269 | B2 | 5/2003 | McMillan et al. | |
| 6,583,521 | B1 * | 6/2003 | Lagod et al. | 307/70 |
| 6,630,752 | B2 | 10/2003 | Fleming et al. | |
| 6,633,802 | B2 | 10/2003 | Sodoski et al. | |
| 6,683,778 | B2 | 1/2004 | Yugou | |
| 6,721,672 | B2 | 4/2004 | Spitaels et al. | |
| 6,741,442 | B1 | 5/2004 | McNally et al. | |
| 6,747,368 | B2 * | 6/2004 | Jarrett, Jr. | 307/31 |
| 6,765,373 | B1 | 7/2004 | Harvey et al. | |
| 6,825,578 | B2 | 11/2004 | Perttu | |
| 6,849,967 | B2 * | 2/2005 | Lathrop et al. | 307/64 |
| 6,876,103 | B2 | 4/2005 | Radusewicz et al. | |
| 6,879,060 | B2 | 4/2005 | Hohri | |
| 7,015,599 | B2 | 3/2006 | Gull et al. | |
| 7,098,555 | B2 | 8/2006 | Glahn et al. | |
| 7,141,891 | B2 | 11/2006 | McNally et al. | |
| 7,142,950 | B2 | 11/2006 | Rasmussen et al. | |
| 7,259,477 | B2 * | 8/2007 | Klikic et al. | 307/65 |
| 7,259,481 | B2 * | 8/2007 | Eaton et al. | 307/125 |
| 7,282,813 | B2 | 10/2007 | Unger et al. | |
| 7,514,815 | B2 | 4/2009 | Paik et al. | |
| 2002/0130556 | A1 | 9/2002 | Hohri | |
| 2002/0134567 | A1 | 9/2002 | Rasmussen et al. | |
| 2003/0034693 | A1 | 2/2003 | Wareham et al. | |
| 2003/0048004 | A1 | 3/2003 | Fleming et al. | |
| 2003/0048005 | A1 | 3/2003 | Goldin et al. | |
| 2003/0062775 | A1 | 4/2003 | Sinha | |
| 2003/0072977 | A1 | 4/2003 | Speranza et al. | |
| 2003/0111842 | A1 | 6/2003 | Gilbreth et al. | |
| 2004/0075343 | A1 | 4/2004 | Wareham et al. | |
| 2004/0084965 | A1 | 5/2004 | Welches et al. | |
| 2004/0169972 | A1 | 9/2004 | Goss | |
| 2006/0072262 | A1 * | 4/2006 | Paik et al. | 361/62 |
| 2007/0018506 | A1 | 1/2007 | Paik et al. | |

OTHER PUBLICATIONS

MGE UPS Systems Brochure, "Galaxy PW—Next Generation Critical Power Protection System," Jun. 2002, 2 pps.

Cutler-Hammer, "Switchboards Integrated Facility Switchboards," Jan. 2003, vol. 1, Ref. No. (0893), 1 pp.

APC User's Guide Brochure, "InfraStruXure Manager," Mar. 2004, 181 pps.

Partial International Search for PCT/US2005/018469 mailed Sep. 2, 2005.

* cited by examiner

APPARATUS AND METHOD FOR PREVENTING AN ELECTRICAL BACKFEED

Matter enclosed in heavy brackets [ ] appears in the original patent but forms no part of this reissue specification; matter printed in italics indicates the additions made by reissue.

BACKGROUND OF INVENTION

1. Field of Invention

Embodiments of the invention relate generally to transfer switches. More specifically, at least one embodiment relates to an apparatus and method for preventing an electrical backfeed resulting, for example, from operation of an automatic transfer switch.

2. Discussion of Related Art

Transfer switches are employed to increase the reliability of an electrical supply to a load by allowing the load to be supplied from two or more sources. For example, a utility electrical supply (e.g., a public utility, a municipal utility, etc.) may provide one electrical supply to a load and a source of backup power (e.g., a standby/emergency generator, uninterruptible power supply, etc.) can provide a second electrical supply to the same load. The transfer switch is used to transfer the load between the two electrical supplies in the event that one of them is unavailable. With some exceptions, applicable electrical codes and national manufacturing standards generally require that the transfer switch maintain electrical isolation between the two electrical supplies for operational and safety reasons. That is, the conductors of the first electrical supply and the conductors of the second electrical supply cannot be connected to one another, even momentarily, e.g., the two electrical supplies cannot be connected to the load in parallel. A backfeed is created when phase conductors of the first electrical supply and phase conductors of the second electrical supply are connected to one another, for example, as a result of a switch failure in a transfer switch. In one failure mode, contacts in the transfer switch weld shut, that is separate contact surfaces fuse together. Contacts do weld shut and fail to operate due to arcing and/or overheating. If for example, a contact connected to the utility fails to open in the transfer switch, the generator supply will backfeed electricity to the utility when the generator is connected to the load.

To meet the requirements for electrical isolation of different electrical supplies, transfer switches (in particular, automatic transfer switches) often employ contactors, force guided relays or motorized circuit breakers to perform the switching that transfers the load from one electrical supply to another. The contactors, relays or circuit breakers are mechanically interlocked to prevent a backfeed between the various power sources connected to the transfer switch. These approaches generally result in transfer switches that are more expensive and more complex than practical for residential applications.

In another approach, control logic is used with power transfer relays in an automatic transfer switch in a residential installation. Regardless of the status of relay contacts, the control logic initiates a transfer of a load to a generator electrical supply when the logic detects a loss of voltage in a utility electrical supply.

Manual transfer switches are sometimes used as an alternative to automatic transfer switches to connect one of two electrical supplies to the load. Manual transfer switches suffer from the obvious drawback that human intervention is required to switch from one electrical supply to another electrical supply. In addition, these switches typically include a mechanical interlock to prevent different electrical supplies from being connected to one another.

SUMMARY OF INVENTION

In order to prevent a backfeed between two or more electrical supplies used to supply a load, at least one embodiment of the invention detects when a switch in an transfer switch has malfunctioned.

In one aspect of the invention, a transfer switch includes a first input to couple a first multiphase low voltage electrical supply to the transfer switch and a second input to couple a second multiphase low voltage electrical supply to the transfer switch. The transfer switch also includes a first set of switches in electrical communication with the first input, a second set of switches in electrical communication with the second input, and a control module. The control module monitors and controls operation of both the first set of switches and the second set of switches to detect a malfunction of any switches included in at least one of the first set of switches and the second set of switches and prevent the first input from being placed in electrical communication with the second input.

In one embodiment, the output couples the transfer switch to a load, and a third set of switches selectively couples the first multiphase low voltage electrical supply and the second low voltage electrical supply to the output. The control module monitors and controls operation of the third set of switches to detect a malfunction of any switches included in the third set of switches and prevent the first input from being placed in electrical communication with the second input. In a version of this embodiment, the transfer switch includes a switching module with a switch included in the first set of switches, a switch included in the second set of switches, and a switch included in the third set of switches.

In another one embodiment, the first input is adapted to couple to a first split-phase electrical supply and the second input is adapted to couple to a second split-phase electrical supply.

In another aspect, the invention provides a method of preventing a backfeed through a transfer switch. The transfer switch includes a first input adapted to receive a first multiphase low voltage power source, a second input adapted to receive a second multiphase low voltage power source and an output. The first input is connected to the output. A transfer is initiated to disconnect the output from the first input and connect the output to the second input. A plurality of switches are operated to complete the transfer. At least one of the plurality of switches is monitored to detect a malfunction of any of the switches, and to prevent the first input from being placed in electrical communication with the second input, the transfer is stopped if a malfunction is detected.

In a further aspect of the invention, a transfer switch includes a first input to couple a first multiphase low voltage electrical supply to the transfer switch and a second input to couple a second multiphase low voltage electrical supply to the transfer switch. The transfer switch also includes a first set of switches in electrical communication with the first input, a second set of switches in electrical communication with the second input, and means for detecting a malfunction in any of the first set of switches and the second set of switches. Upon detecting a malfunction, the means for detecting the malfunction in any of the first set of switches and the second set of switches prevents a connection of at least one of the first input and the second input.

BRIEF DESCRIPTION OF DRAWINGS

The accompanying drawings, are not intended to be drawn to scale. For purposes of clarity, not every component may be labeled in every drawing. In the drawings.

DETAILED DESCRIPTION

Figure 1:
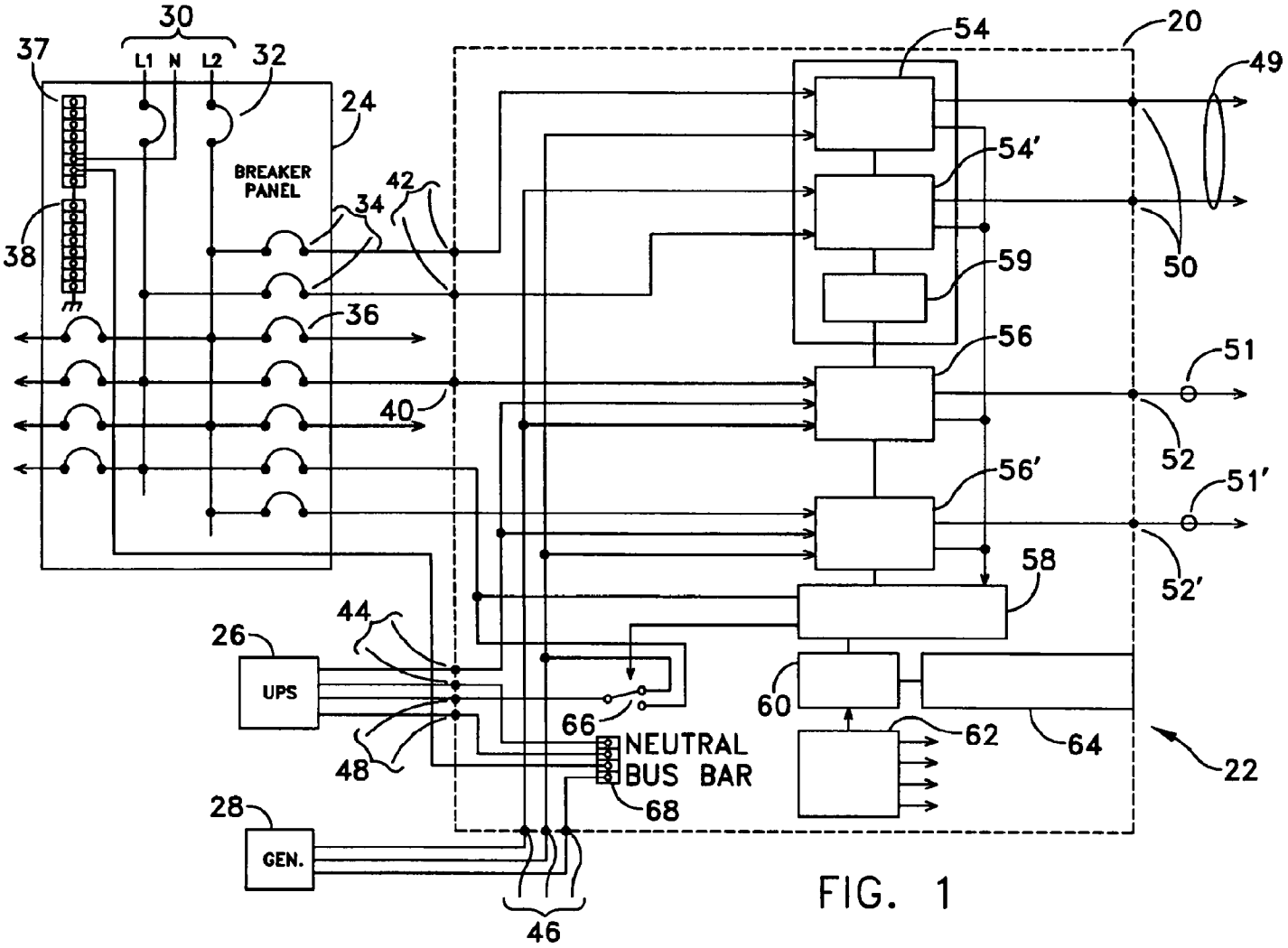
FIG. 1 is a block diagram of a transfer switch employed in an electrical system according to one embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Generally, a transfer switch used in a residential application isolates separate power sources when transferring the residential load from a primary power source to an alternate power source. In one embodiment, the invention facilitates operation in this manner by sensing whether the switches employed in the transfer switch are operational, for example, by sensing whether the switches are in positions that are consistent with their states as determined by control logic. In a version of this embodiment the transfer switch is an automatic transfer switch.

Referring now to FIG. 1, one embodiment of a transfer switch 20 is shown connected in an electrical system 22. In addition to the transfer switch 20, the electrical system 22 shown in FIG. 1 includes a circuit breaker panel 24, an uninterruptible power supply 26 and an emergency generator 28. The circuit breaker panel 24 is connected to a primary source of power 30, for example, a utility supply. Each of the uninterruptible power supply 26 and the emergency generator 28 provide an alternate source of power to the transfer switch 20. The emergency generator 28 can be driven by any of a variety of power plants including a gas engine, a diesel engine, gas turbine, etc. Although the uninterruptible power supply 26 and the emergency generator 28 are shown, other alternative sources of power could be used to provide backup power including a second utility supply, a fuel cell inverter and alternative energy sources such as wind turbines, and solar panels.

In FIG. 1, the primary source of power 30 is a multiphase power source. As used herein, the term multiphase describes any power source that includes at least two line conductors. In one embodiment, the power supplied by each line conductor is out of phase relative to the other line conductors. Thus, as used herein, a multiphase power source can include two or more phase conductors from a three phase system. In addition, a multiphase power source can include two line conductors from a split-phase power source. In one embodiment, the primary source of power 30 is a 120/240 volt split-phase power source.

The circuit breaker panel 24 includes a main circuit breaker 32, two-pole circuit breakers 34, single-pole circuit breakers 36, a neutral bus 37 and a ground bus 38. In one embodiment, the main circuit breaker 32 is a 200 ampere circuit breaker, the two-pole circuit breakers are 20 ampere circuit breakers, and the single pole circuit breakers are 15 ampere circuit breakers. In one embodiment, two-pole circuit breakers 34 include two circuit breakers that are mechanically connected to insure that they operate substantially simultaneously. In one embodiment, the circuit breaker panel 24 is installed in a residential electrical service. In a version of this embodiment, each of the single-pole circuit breakers 36 are connected to a single phase input 40 of the transfer switch 20, and each of the two-pole circuit breakers are connected to multiphase input 42. In an alternate embodiment, only selected single-pole circuit breakers 36 are connected to a single phase input 40 and only selected two-pole circuit breakers 34 are connected to a multiphase input 42. A first alternate source of power is connected to a first alternate input 44 and a second alternate source of power is connected to a second alternate input 46. Where an uninterruptible power supply 26 is used, the transfer switch 20 may include a UPS output 48 to supply power to the uninterruptible power supply 26, for example, to charge the UPS batteries.

Electrical load circuits (e.g., supplying power to receptacles, lighting circuits, etc.) are connected to outputs of the transfer switch. Each multiphase load circuit 49 is connected to a separate multiphase output, for example, multiphase output 50. Each single phase load circuit 51, 51' is connected to a separate single-phase 120 volt output, for example, single-phase outputs 52, 52', respectively. In one embodiment, each single-phase output supplies 120 VAC and each multiphase output supplies 240 VAC.

The transfer switch 20 includes multiphase switching modules 54, 54', and single-phase switching modules 56, 56'. In the embodiment shown in FIG. 1, each multiphase switching module 54, 54' switches one line conductor of a multiphase circuit, and each single-phase switching module 56, 56' switches the single line conductor of a single-phase circuit. In a version of this embodiment, a single pair of multiphase switching modules dedicated for multiphase operation are included in the transfer switch 20. In another embodiment, the switching modules are reconfigurable. For example, the transfer switch 20 can be equipped with two switching modules 56, 56' that can separately switch a line conductor of a single-phase circuit and can be reconfigured to operate as a multiphase switching module 54, 54' to switch a line conductor of a multiphase circuit. In a version of this embodiment, the transfer switch is equipped with a plurality of reconfigurable switching modules that can be reconfigured to operate as either single-phase switching modules 56, 56' or multiphase switching modules 54, 54'. That is, the quantity of each type of switching module can be changed to suit the requirements of a specific installation.

The transfer switch 20 also includes a main control module 58, a multiphase control module 59, a user interface 60, a power supply 62, a communications module 64, a UPS switch 66 and a neutral bus 68. Each switching module 54, 54', 56 and 56' can include current and voltage sensing with outputs communicated to the main control module 58, for example, to monitor for energy use, overload conditions, etc. In one embodiment, logic in the multiphase control module 59 senses the position of switches included in the multiphase switching modules 54, 54' and controls the operation of the switches in the multiphase switching modules 54, 54'. In a version of this embodiment, a single multiphase control module 59 controls each multiphase switching module 54, 54' employed in the transfer switch 20. In another embodiment, the main control module 58 includes logic to sense the position of one or more switches included in both the multiphase switching modules 54, 54', and the single-phase switching modules 56, 56', and logic to control the operation of the switches included in both the multiphase switching modules 54, 54' and the single-phase switching modules 56, 56'.

The main control module 58 can also control operation of the UPS switch 66. For example, in one embodiment, power is supplied to the UPS input 48 from the circuit breaker panel 24 during normal operation, however, when power from the normal supply 30 is lost, the main control module 58 switches the position of UPS switch 66 so that power is supplied to the UPS from an alternate source, i.e., the UPS output 48 is connected to the second alternate input 46, for example, a backup generator.

In one embodiment, the user interface 60 includes a display and an input device (e.g., a keypad, a touch screen, etc.) to communicate with the main control module 58. The user interface provides a user the opportunity to review the status of the transfer switch 20 including: 1) monitoring the existing electrical parameters (e.g., current, voltage, etc.) for one or more of the load circuits 49, 51, 51'; 2) monitoring stored electrical parameters (e.g., power consumption, peak current, etc.); and 3) adjusting set points, for example, a minimum voltage level that triggers a transfer from primary power to one of the alternate power sources. In addition, the user interface 60 can provide a means of configuring the transfer switch 20 to meet the user's needs. For example, the user interface 60 can allow the user to establish whether reconfigurable switching modules are deployed as single-phase switching modules 56, 56' or multiphase switching modules 54, 54'. The user may also be able to select the ampacity of the load circuits 49, 51, and 51', for example, by choosing from standard ratings such as 15 ampere and 20 ampere ratings. The user may also employ the user interface 60 to adjust setpoints or delays. As one example, a user may establish a setpoint for initiating a generator start signal to start a backup generator after primary power is lost.

The transfer switch 20 also includes a power supply module 62 that can include one or more circuits for generating control power and logic levels used in the switch 20. In one embodiment, an input to the power supply module 62 is supplied from one of the primary source and the alternate source. Generally, in one embodiment, the switching of the power supply input is controlled either manually or by logic that determines the availability of primary and alternate power and the status of at least the multiphase switching modules (e.g., determines which source is supplying the load circuits). In a version of this embodiment, the power supply input is connected to the primary source whenever the primary source is available. When the primary source is unavailable, the power supply input is automatically disconnected from the primary source and is automatically connected to the alternate source if the alternate source is available. Further, in one version the power supply input is automatically disconnected from the alternate source and automatically re-connected to the primary source when the primary source again becomes available, i.e., primary source power is restored. In one embodiment, the power supply module 62 provides +3.3 V, +5 V, +12V and −12V DC outputs.

The communications module 64 provides a connection for an external communication network, for example, a connection to one or both of a local area network or a wide area network, e.g., a wireless network. As a result, a remote user can access the user interface 60 via phone, a remote touchpad, or a remote computer.

Figure 2:
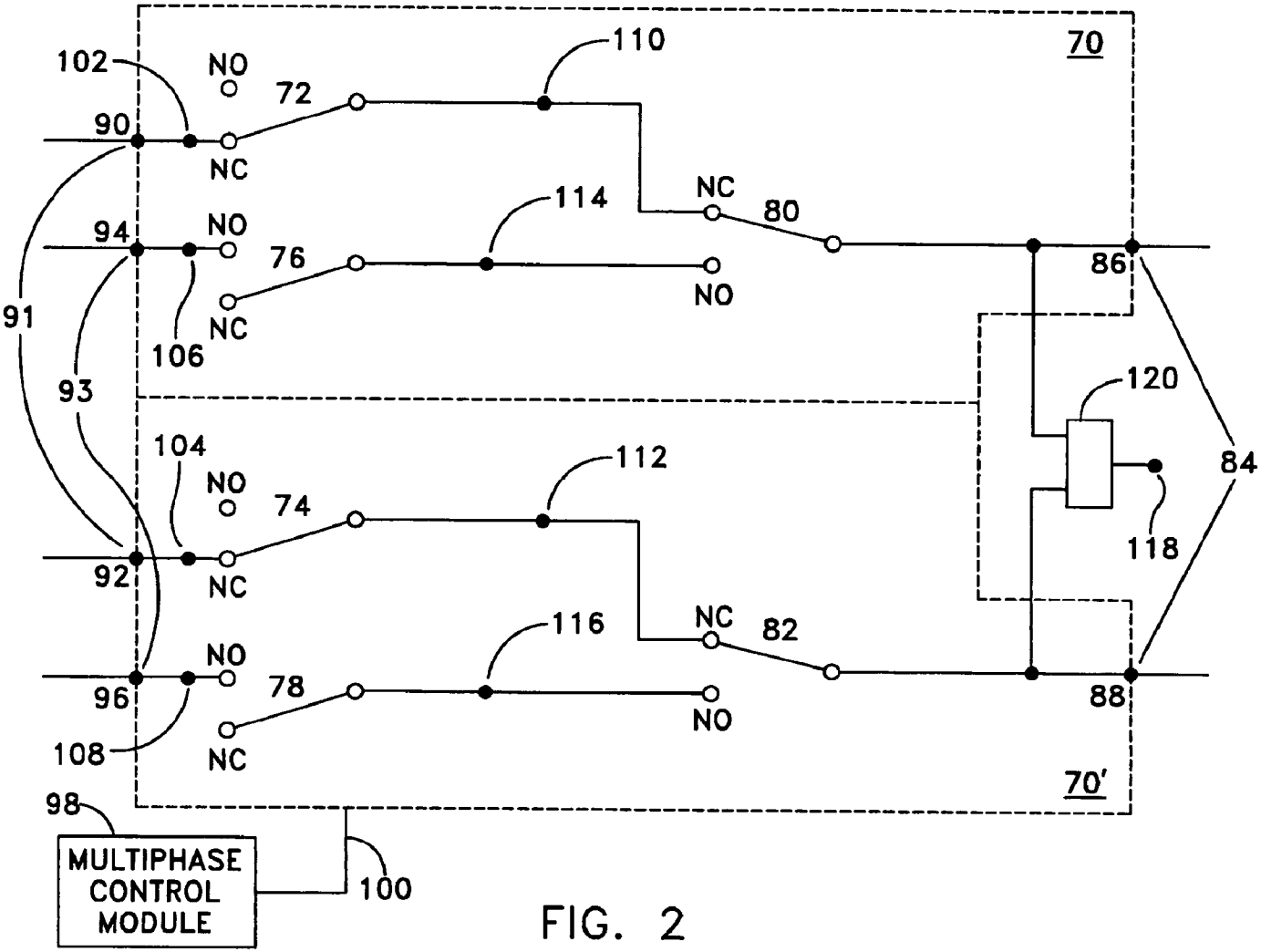
FIG. 2 is schematic diagram of switch connections in a transfer switch according to one embodiment of the invention.

Referring now to FIG. 2, one embodiment of multiphase switching modules 70, 70', which may be used in the transfer switch 20 in place of the multiphase switching modules 54, 54' of FIG. 1, are shown. In the embodiment shown in FIG. 2, the multiphase switching module 70 provides switching for a first line conductor (e.g., a first phase) of a multiphase supply and multiphase switching module 70' provides switching for a second line conductor of the multiphase supply (e.g., a second phase). Together, the multiphase switching modules 70, 70' include three sets of switches: a first set of switches includes switch 72 and switch 74; a second set of switches includes switch 76 and switch 78; and, a third set of switches includes switch 80 and switch 82. In the embodiment shown in FIG. 2, each switch is a single pole double throw switch, that is, there is a single switch element that can be moved between a first closed position and a second closed position (e.g., a form C relay). In addition each switch 72, 74, 76, 78, 80 and 82 is electrically operated such that each switch has a normally open contact position (NO) and a normally closed contact position (NC). Although each switch 72, 74, 76, 78, 80, 82 is described as being included in a single pole double throw relay in the embodiment of FIG. 2, each switch can be any contact capable of carrying current and operable between a first position and a second position. As one example, each switch 72, 74, 76, 78, 80, 82 can also be replaced by two single pole single throw switches that are operated in a manner that mimics the operation of the corresponding single pole double throw switches. In one embodiment, switches 72, 74, 76, 78, 80 and 82 are a miniature relay for printed circuit board mounting, for example, part number 832A-1C-S-24DC manufactured by Song Chuan. In other embodiments, switches 72, 74, 76, 78, 80, 82 could instead be included in contactors, circuit breakers, or solid state switches. Further, in one embodiment, switches 72, 74, 76, 78, 80, 82 are included in a single multiphase switching module.

In FIG. 2, the multiphase switching modules 70, 70' provide a primary input 91 including a first terminal 90 for multiphase switching module 70 and a second terminal 92 for multiphase switching module 70'. The multiphase switching modules 70, 70' also include an alternate input 93 including a first terminal 94 for multiphase switching module 70 and a second terminal 96 for multiphase switching module 70'. The multiphase switching modules 70, 70' also provide an output 84 including a first terminal 86 for multiphase switching module 70 and a second terminal 88 for multiphase switching module 70'. In one embodiment, a multiphase control module 98 (similar to multiphase control module 59 discussed above) communicates with the multiphase switching modules 70, 70' via a communication bus 100 which is connected to each switching module 70, 70'. The multiphase control module controls the operation of the switches 72, 74, 76, 78, 80, 82 to supply power to the output 84 while preventing a connection between the primary input 91 and the alternate input 93. In one embodiment, the multiphase control module 98 includes logic that prevents even a momentary connection between the primary input 91 and the alternate input 93 including connections via a load, i.e., it prevents a connection between any of the first terminal 90 and the second terminal 92 of the primary input 91, and any of the first terminal 94 and the second terminal of the alternate input 93.

The control module 98 can be implemented in hardware, software, firmware or a combination thereof. In one embodiment, the control module 98 is a complex programmable logic device ("CPLD"), for example, from the MAX 7000 family sold by Altera Corporation. In another embodiment, the control module 98 can be implemented in a microprocessor or microcontroller executing embedded software and/or firmware instructions. In an alternative embodiment, the control module 98 is implemented in combinatorial logic and sequential logic.

The communication bus 100 can be any single line or multi-line bus capable of transmitting control and sensing signals between the multiphase control module 98 and the multiphase switching modules 70, 70'. For example, in one embodiment, the communication bus 100 includes a plurality of discrete lines with a separate line dedicated to each input to the multiphase control module 98 (e.g., voltage sensing inputs) and a separate line dedicated to each output. The outputs can, for example, be signals supplied by the multiphase control module 98 to transistors co-located with relays employed in multiphase switching module 70, 70', for example, mounted together on a printed circuited board. The signals provided by the multiphase control module 98 can operate a transistor used to switch on and off a coil of a relay employed in multiphase switching module 70, 70'. In a further embodiment, the communication bus 100 also includes one or more lines that connect the multiphase control module 98 to a main control module, such as main control module 58 of transfer switch 20. In a version of this embodiment, the communication bus also includes one or more lines that connect the main control module 58 to the multiphase switching modules 70, 70'. In addition, the transfer switch may include a control power bus (not shown) that is connected to the main control module 58 and the multiphase control module 98.

The multiphase switching modules 70, 70' include a plurality of sensing nodes that can each supply an input to the multiphase control module 98 via the communication bus 100. One or more of the sensing nodes can also supply an input to the main control module 58 via the communication bus 100. In an alternate embodiment, the main control module 58 receives as inputs signals provided by the multiphase control module 98 instead of or in addition to signals provided from the multiphase switching modules 70, 70'. In addition, communication bus 100 connects the control module 98 to each switch 72, 74, 76, 78, 80, 82 to provide switching control logic to the switches. In one embodiment, based on a monitored voltage or current provided by sensing nodes, the multiphase control module 98 senses the availability of normal and alternate power sources and the status of switches 72, 74, 76, 78, 80, 82, i.e., whether the switch is in the normally-closed or the normally-open position. In this embodiment, the multiphase control module 98 uses this information to determine whether the switches must be operated to supply power to the load, for example, when it is necessary to switch to an alternate source of power because the primary source of power is unavailable. In addition, the multiphase control module 98 implements control logic to insure that a backfeed, even a momentary backfeed, is not created when one or more of the switches 72, 74, 76, 78, 80, 82 are operated.

In a further embodiment, the main control module 58 determines the availability of the primary and alternate power sources and provides information to the multiphase control module 98 regarding the power source that should be used. The multiphase control module 98 is then responsible for operating the switches 72, 74, 76, 78, 80, 82 in a manner that prevents a backfeed. In a version of this embodiment, the main control module 58 receives inputs associated with the primary and the alternate sources of power, for example, from one or more sensing nodes or from another voltage-sense signal that may not be provided by the switching module 70, 70', e.g., the voltage sensing may be performed elsewhere in the transfer switch 20 or the circuit breaker panel 24. The main control module 58 uses the information provided by the voltage-sense signal to determine the availability of the primary and the alternate power sources. In this embodiment, the main control module 58 determines the appropriate source of power and provides this information as one or more inputs to the multiphase control module 98. The multiphase control module 98 then determines whether any switching is required, and if so, whether the switching can be accomplished without creating a backfeed.

In one embodiment, the transfer switch 20 complies with Underwriter's Laboratory Standard 1008 ("UL 1008"). UL 1008 requires that a transfer switch prevent even a momentary backfeed between different sources of power (e.g., prevent a backfeed between a primary and an alternate source of power) even when there is only a single switch failure. In a version of this embodiment, three switches (e.g., 72, 76, 80) are employed in each of switching modules 70, 70'. In an alternate embodiment, however, only two switches are employed in each multiphase switching module 70, 70. For example, in FIG. 2, switches 76 and 78 are eliminated, or alternatively, switches 72 and 74 are eliminated in this alternate embodiment.

In one embodiment, transfer switch 20 is configured for operation with primary and alternate power sources that include 3 or more phases. For example, a transfer switch 20 can include multiphase switching modules capable of switching 3-phase sources in a manner that complies with UL 1008. In a version of this embodiment, a third multiphase switching module corresponding to multiphase switching modules 70, 70' is added to the transfer switch 20 to switch the third phase of a multiphase source.

In one embodiment, to prevent a connection between a normal source of power and an alternate source of power, the multiphase control module 98 also determines, based on the outputs of the sensing nodes, whether one or more of switches 72, 74, 76, 78, 80, 82 are operative before generating a control signal to operate a switch. In the embodiment shown in FIG. 2, these sensing nodes include a first primary sense node 102, a second primary sense node 104, a first alternate sense node 106, a second alternate sense node 108, a first primary switched node 110, a second primary switched node 112, a first alternate switched node 114, a second alternate switched node 116 and an output node 118. In one embodiment, an optoisolator 120 is connected across the output 84 between terminals 86 and 88 to provide the signal at the output node 118. In one embodiment, for example, the optoisolator corresponds to part number SFH615A-4 manufactured by Vishay. In one embodiment, the sensing nodes 102, 104, 106, 108, 110, 112, 114, 116 employ the same optoisolator to generate logic signals. In another embodiment, each pair of sensing nodes (e.g., 102/104, 106/108, 110/112, 114/116) can employ a separate optoisolator so that a single logic signal is provided for the primary input, the alternate input, etc.

In one embodiment, the multiphase control module 98 of FIG. 2 include a connection to the system neutral. In a version of this embodiment, the neutral input allows for independent detection of a single-switch failure. For example, such an approach can provide information used to determine whether switch 72 or switch 74 failed. In one or more versions of this embodiment, the neutral conductor is not disconnected when switching is performed.

Operation of the multiphase switching modules 70, 70' of FIG. 2 will now be described with reference to the flow charts provided in FIGS. 3, 4 and 5. In addition, in the interest of clarity, each sense node is associated with a corresponding logic point as follows: the first primary sense node 102 corresponds with logic point PR1; the second primary sense node 104 corresponds to logic point PR2; the first alternate sense node 106 corresponds to logic point ALT1; the second alternate sense node 108 corresponds to logic point ALT2; the first primary switched node 110 corresponds to logic point SWPR1; the second primary switched node 112 corresponds to logic point SWPR2; the first alternate switched node 114 corresponds to logic point SWALT1; the second alternate switched node 116 corresponds to SWALT2; and, the output node 118 corresponds to CKTO. One additional logic point, CPL corresponds to the status of the power supplied to the multiphase control module 98, i.e., the control power. Each logic point typically provides HI and LO logic levels which depend upon the status of the transfer switch 20.

Figure 3:
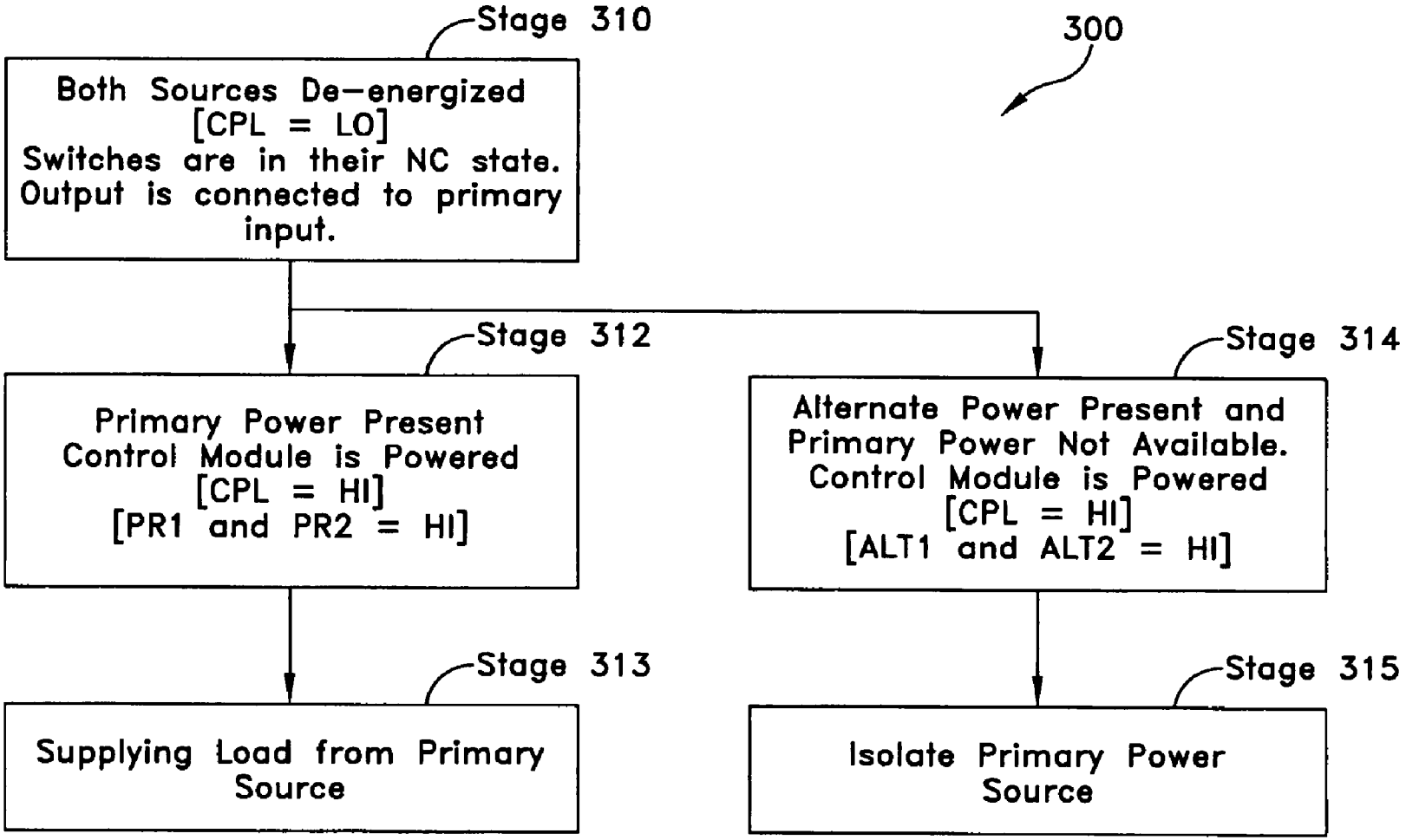
FIG. 3 is a flow chart of a process employed with one embodiment of the transfer switch of FIG. 2 beginning at a point in time at which neither primary nor alternate power is available.
Figure 4:
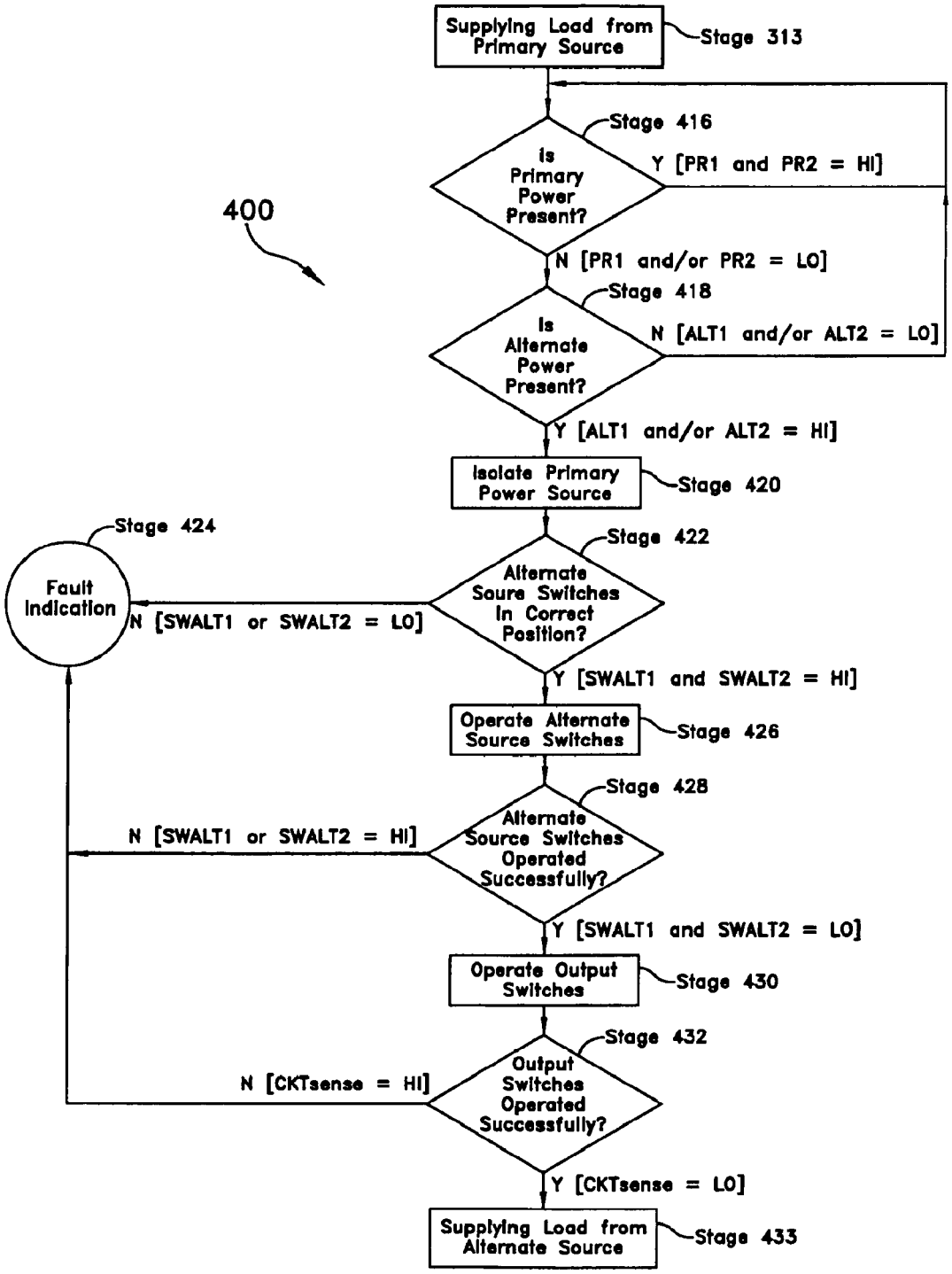
FIG. 4 is a flow chart of another process employed with one embodiment of the transfer switch of FIG. 2 beginning at a point in time when a primary source of power is supplying a load.
Figure 5:
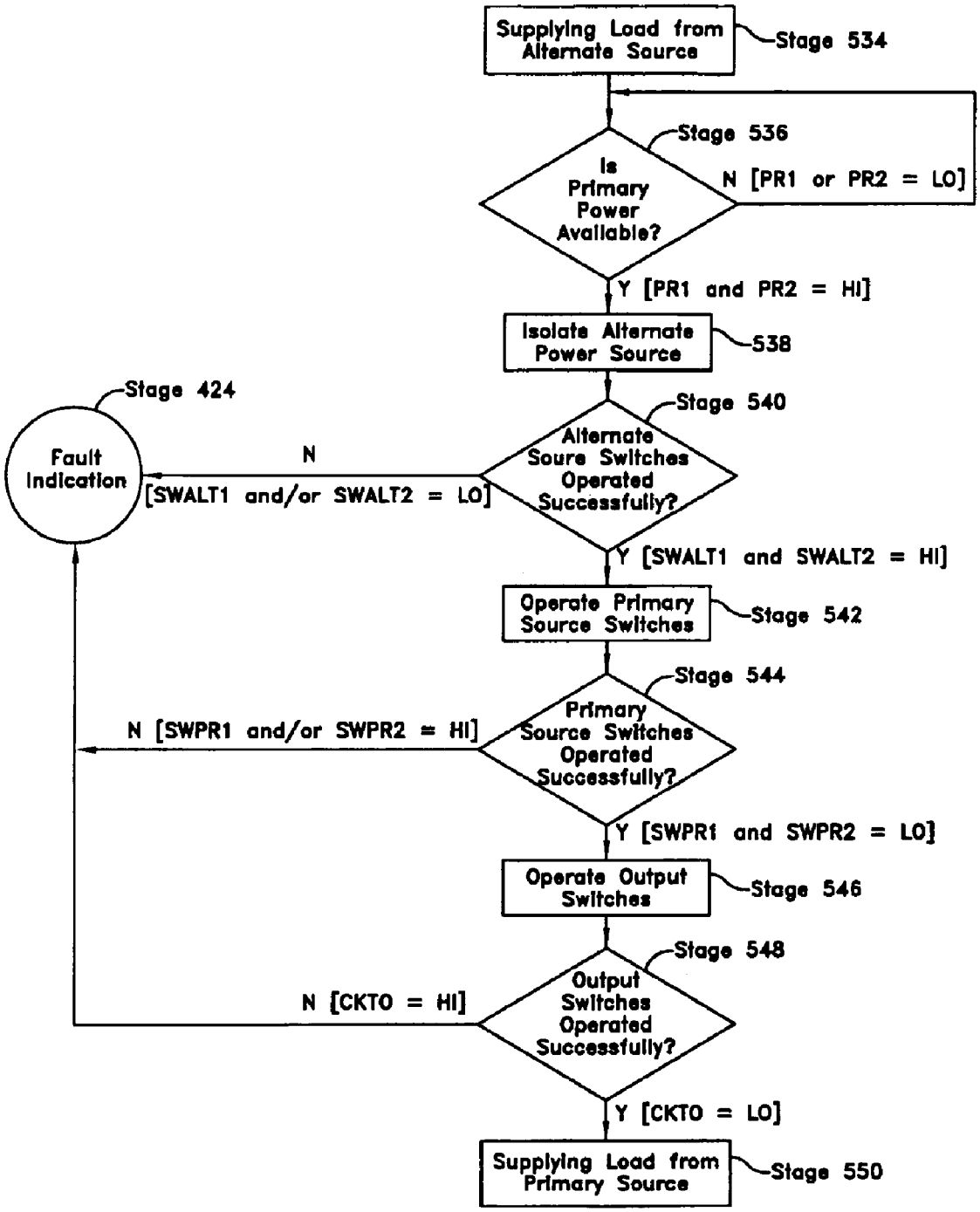
FIG. 5 is a flow chart of a further process employed with one embodiment of the transfer switch of FIG. 2 beginning at a point in time when an alternate source of power is supplying a load.

For purposes of explaining operation of the multiphase switching modules 70, 70' in FIGS. 3, 4 and 5 the following logic scheme applies: each of logic points PR1, and PR2 provide a logic HI signal when the corresponding line voltage of the primary source is present at PR1 and PR2, respectively; each of logic points ALT1 and ALT2 provide a logic HI signal when the corresponding phase voltage of the alternate source is present at ALT1 and ALT2, respectively; each of logic points SWPR1, SWPR2, SWALT1, and SWALT2 provide a logic LO signal when a voltage is present at their respective sensing node; the CKTO logic point provides a logic LO signal when voltage is present at the output 84; and, the CPL provides a logic HI signal when voltage is present on a control power bus for the multiphase control module 98. In other embodiments, the logic signals corresponding to the circuit conditions mentioned above differ from the logic states described above. In one embodiment, an opto isolator is used with each logic point (e.g., opto isolator 120). In another embodiment, an opto isolator is only used with those logic points that provide a LO signal when voltage is present at the corresponding sensing node. Of course, with the flexibility provided by discrete logic sensing, a variety of configurations may be employed. For example, in one embodiment, each logic point provides a logic HI signal when a voltage is present at the corresponding sensing node. In an alternate embodiment, each logic point provides a logic LO signal when a voltage is present at the corresponding sensing node.

The physical location of the sensing nodes may also be changed in various embodiments. In one embodiment, the primary sense nodes 102, 104 and the alternate sense nodes 106, 108 are not located in multiphase switching modules 70, 70'. Instead, the primary sense nodes 102, 104 can be located on the line side of multiphase switching modules 70, 70', for example at primary input 42. The alternate sense nodes 106, 108 can also be located on the line side of switching modules 70, 70', for example, at second alternate input 46. In one embodiment, the sensing nodes 102, 104, 106, 108 are connected to inputs of the main control module 58.

FIG. 3 depicts a flow diagram of a process 300 for controlling the multiphase switching modules 70, 70' in accordance with one embodiment. Specifically, the process 300 begins at a time when neither the primary nor the alternate power source is available and continues until such time as power first becomes available on either the primary input 91 or the alternate input 93, shown in FIG. 2. The CPL logic point provides a logic LO signal when neither the primary nor the alternate power sources are available (Stage 310). At this time, each of the switches 72, 74, 76, 78, 80, 82 are in their normally closed (NC) position and the control logic is off. When either primary power or alternate power become available, control logic becomes available and CPL transitions to a logic HI state. If primary power becomes available, PR1 provides a logic HI signal because voltage is present at first primary sense node 102 and PR2 provides a logic HI signal because voltage is also present at second primary sense node 104 (Stage 312). If alternate power becomes available, ALT1 provides a logic HI signal because voltage is present at first alternate sense node 106 and ALT2 provides a logic HI signal because voltage is also present at second alternate sense node 108 (Stage 314).

Because the default state of the switches 72, 74 and 80, 82 is normally closed (NC) in the embodiment shown in FIG. 2, primary power is supplied to the output 84 of the multiphase switching modules 70, 70' if primary power is restored before alternate power is available (Stage 313). That is, without operating any switches 72, 74, 76, 78, 80, 82, the primary input 91 is connected to the output 84 when neither primary power nor alternate power are available. Conversely, the default state of the switches 76, 78 and 80, 82 disconnects the alternate input 93 from the output 84 when neither primary power nor alternate power are available. Thus, in one embodiment, when the alternate power supply is available at the alternate input 93, the multiphase control module 98 processes logic to determine whether the alternate input 93 should be connected to the output 84. If primary power is unavailable, the primary power source is isolated (Stage 315).

FIG. 4 depicts a process 400 including a sequence of stages employed in one embodiment to transfer the load connected to output 84 from the primary power source to the alternate power source. The process 400 starts at Stage 313 of FIG. 3 with the primary power source supplying power to the load. In one embodiment, the multiphase control module 98 continuously monitors the state of PR1 and PR2 to determine whether primary power is available (Stage 416). As described above, PR1 and PR2 each provide a logic HI signal if power is present at the primary input 91. When PR1 and PR2 are HI the primary input 91 remains connected to the output 84. In one embodiment, the availability of alternate power at alternate input 93 allows a user to override the standard logic, disconnect the primary input 91, and connect the alternate input 93 to the output 84, for example, to conduct load testing of the alternate source. In one embodiment, a transition of either or both of PR1 and PR2 to a LO state provides an indication that primary power is unavailable. When primary power is unavailable, the multiphase control module 98 determines whether alternate power is available. In one embodiment, the multiphase control module 98 continuously monitors the state of ALT1 and ALT2 to determine whether alternate power is available (Stage 418). The availability of power at alternate input 93 is indicated when ALT1 and ALT2 provide a logic HI signal. For example, in one embodiment, each of ALT1 and ALT2 provide a logic LO signal until a generator connected to the alternate input 93 starts and begins to supply voltage to the alternate input 93, at which time ALT1 and ALT2 transition to a logic HI. When the primary source is unavailable and alternate power is sensed, the multiphase control module 98 provides logic signals to open switches 72 and 74 in order to disconnect the primary input 91 from the output 84 (Stage 420). In one embodiment, the multiphase control module 98 also provides a generator start signal to start a generator when primary power is unavailable. In another embodiment, the main control module 58 provides the generator start signal.

Once multiphase control module 98 provides the logic signals to open switches 72, 74, the multiphase control module 98 determines whether the switches 76, 78 connected to the alternate input are in the correct position (Stage 422), i.e., normally closed (NC). If either switch 76, 78 is in the normally open (NO) position, a voltage is present at the corresponding sensing node 114, 116, respectively. If switch 76 has malfunctioned and remains in the normally open position then the presence of voltage at sensing node 114 is indicated by logic point SWALT1 providing a logic LO signal. Similarly, if switch 78 has malfunctioned and remains in the normally open position the presence of voltage at sensing node 116 is indicated by logic point SWALT2 providing a logic LO signal. If either SWALT1 or SWALT2 is LO, the multiphase control module 98 is not provided a logic signal to operate switches 76 and 78, but instead generates a signal indicating that there is a fault with either or both of switches 76, 78 (Stage 424). In one embodiment, a switch-failure indication is provided at the user interface 60 (e.g., an audible alarm, a flashing display, etc.) and an alarm signal is transmitted to a remote location via the communication module 64 to indicate that there is a problem with transfer switch 20. Further, although the fault sensing described herein is referred to as detecting a switch failure or switch malfunction, the fault sensing detects any failure mode that prevents contacts from operating according to the switching logic. For example, the multiphase control module 98 will detect a failure due to an open relay coil, mechanical binding of a switch operator, and the like. Thus, switch failure and switch malfunction refer to the failure of a contact to be in the state desired by the switching logic regardless of the cause.

If each of SWALT1 and SWALT2 is HI, the multiphase control module 98 provides logic signals to operate switches 76, 78 (Stage 426). The multiphase control module 98 then determines whether the switches 76, 78 connected to the alternate input have moved to the normally open (NO) position in response to the logic signals provided by the control module 98 (Stage 428). At this time, the presence of voltage (supplied from the alternate input 93) at sensing nodes 114 and 116 is expected. Therefore, if both SWALT1 and SWALT2 are LO, the switches 76, 78 are in the correct positions. Conversely, a logic HI signal provided by SWALT1 indicates that switch 76 remains in the normally closed (NC) position, and a logic HI signal provided by SWALT2 indicates that switch 78 remains in the normally closed (NC) position. If either SWALT1 or SWALT2 is in a logic HI state, the alternate input 93 is not connected to the output 84. Instead, the multiphase control module 98 generates a signal indicating that there is fault with either or both of switches 76, 78 (Stage 424).

If each of SWALT1 and SWALT2 is LO, the multiphase control module 98 provides logic signals to operate switches 80, 82 (Stage 430). In the embodiment shown in FIG. 2, switches 80, 82 are source-selector switches that when in their normally closed (NC) position connect the output 84 to the switches 72, 74 connected to the primary input 91. When in their normally open (NO) position, switches 80, 82 connect the output 84 to the switches 76, 78 connected to the alternate input 93. Thus, provided that switches 76, 78 are in their normally open (NO) position, the alternate input 93 is connected to the output 84 when switches 80, 82 move to their normally open (NO) position in response to logic signals provided by the multiphase control module 98 at Stage 430. In addition, the multiphase control module 98 confirms whether the switches 80, 82 have in fact moved to their normally open (NO) position in response to the logic signals. In the embodiment shown in FIG. 4, sensing node 118 provides an indication of the position of switches 80, 82 (Stage 432). If the CKTO logic point provides a logic HI signal the multiphase control module 98 generates a signal indicating that there is fault with either or both of switches 80, 82 (Stage 424). In one embodiment, in response to a fault associated with switches 80, 82, the multiphase control module generates logic signals to operate switches 76, 78 in order to isolate the alternate input 93 from the faulty switch or switches 80, 82. If the CKTO provides a logic LO signal, the alternate input 93 remains connected to the output 84 until the primary power becomes available again at primary input 91 (Stage 433).

Referring now to FIG. 5, a flow diagram depicts a process 500 employed in one embodiment to transfer the load connected to the output 84 from the alternate power source to the primary power source. Initially, the alternate input 93 is connected to the output 84 in order to supply the load during periods when the primary power source is unavailable (Stage 534). In one embodiment, during the period that the primary power source is unavailable, the multiphase control module 98 continuously monitors for the return of the primary power at sensing nodes 102, 104 (Stage 536). When primary power is again available, both PR1 and PR2 provide a logic HI signal. In response, the multiphase control module 98 performs the switching necessary to isolate the alternate input 93 from the output 84 and to connect the primary input 91 to output 84. The multiphase control module 98 generates logic signals to operate switches 76, 78 so that each switch 76, 78 moves to the normally closed (NC) position (Stage 538). The multiphase control module 98 senses the status of each switch 76, 78 based on the state of logic points SWALT1 and SWALT2 corresponding to sensing nodes 114, 116, respectively (Stage 540). A voltage present on sensing nodes 114, 116 indicates that the corresponding switch (76, 78, respectively) has malfunctioned and remains in the normally open (NO) position. Thus, if either or both of SWALT1 and SWALT2 are LO the multiphase control module 98 senses a malfunction of the corresponding switch (76, 78, respectively) and generates a signal (e.g., a fault signal, trouble signal, etc.) indicating that there is fault with either or both of switches 76, 78 (Stage 424). In one embodiment, a generator supplying the alternate source is shutdown regardless of the status of switches 76, 78 when the primary source is again present at the primary input 91. In one embodiment, once the multiphase control module 98 generates a fault signal none of switches 72, 74, 76, 78, 80 and 82 are operational (e.g., the switches are electrically locked out) until the multiphase control module 98 receives an input indicating that the problem was cleared, for example, a user provides such an indication via the user interface 60. Such an approach assures that a backfeed will not occur as a result of a switch malfunction by preventing, for example, a connection between the first terminal 90 of the primary input 91 and the second terminal 108 of the alternate input 93 via the load connected to the output 84.

The multiphase control module 98 generates a logic signal to operate switches 72, 74 from their normally open (NO) position to their normally closed (NC) position if switches 76, 78 have successfully switched to their normally closed (NC) position (Stage 542). After generating the logic signal to operate switches 72, 74, the multiphase control module 98 senses the status of switches 72, 74 based on the state of logic points SWPR1 and SWPR2 (Stage 544). A voltage present at sensing nodes 110, 112 indicates that the switches (72, 74, respectively) have moved to their normally closed (NC) position. Thus, if both SWPR1 and SWPR2 are LO then switches 110, 112 have in fact moved to their normally closed (NC) position, and the multiphase control module 98 will generate a logic signal to operate switches 80, 82 to move them from their normally open (NO) position to their normally closed (NC) position (Stage 546). If, however, either SWPR1 or SWPR2 are HI then the corresponding switch (72, 74, respectively) has malfunctioned and therefore failed to move to the normally closed (NC) position. As a result, the multiphase control module 98 senses a switch malfunction and generates a signal (e.g., a fault signal, trouble signal, etc.) indicating that there is fault with either or both of switches 72, 74 (Stage 424).

The multiphase control module 98 generates logic signals to operate switches 80, 82 from their normally open (NO) position to their normally closed (NC) position if switches 72, 74 have successfully switched to their normally closed (NC) position (Stage 546). After generating the logic signal to operate switches 80, 82, the multiphase control module 98 senses the status of switches 80, 82 based on the state of logic point CKTO (Stage 548). When voltage is present at the first terminal 86 of the output 84 and the second terminal of the output 88, CKTO will provide a LO signal indicating that switches 80, 82 have successfully moved to their normally closed (NC) position. Conversely, with CKTO HI the multiphase control module 98 senses a malfunction of at least one of the switches 80, 82 and generates a signal (e.g., a fault signal, trouble signal, etc.) indicating that there is fault with either or both of switches 80, 82 (Stage 424). The primary input 92 remains connected to the output 84 provided that switches 80, 82 successfully switched to their normally closed (NC) position and provided that multiphase control module 98 does not initiate a transfer to an alternate source, for example, if the primary power source fails.

The embodiment described with reference to FIGS. 3, 4 and 5 employs the multiphase control module 98 to detect the availability of the primary and the alternate sources, i.e., via PR1/PR2 and ALT1/ALT2, respectively. In another embodiment, however, the main control module 58 is employed to monitor logic points PR1, PR2, ALT1, and ALT2. In a version of this embodiment, the multiphase control module 98 waits to receive information from the main control module 58 concerning the status of the primary and the alternate sources of power before performing any switching.

In one embodiment, the logic described with reference to FIGS. 3, 4 and 5 is implemented in a state machine implemented by the multiphase control module 98. In a version of this embodiment, a CPLD includes the state machine. Further, the state machine can be embodied in an algorithm or a plurality of algorithms stored in the memory and executed by a processor or processors located in the multiphase control module 98. In one embodiment, the memory is included in the multiphase control module 98. In a version of the preceding embodiments, a portion of the logic described with reference to FIGS. 3, 4 and 5 is implemented in the multiphase control module 98 and another portion of the logic is implemented in the main control module 58.

Each of the switching modules described thus far can also include integral overcurrent protection. For example, in embodiments of each of the switching modules described herein (e.g., 52, 54, 70, etc.), a fuse may be included in each line conductor. In a version of this embodiment, the fuse is connected to the output of the switching module with which it is associated (e.g., each line of output 84 of FIG. 2). In addition, embodiments of each of the switching modules described herein (e.g., 52, 54, 70, etc.) may include current and voltage sensing. For example, in an embodiment of multiphase switching modules 70, 70' of FIG. 2, a first current sensor senses current flow at a point between switch 80 and first terminal 86, a second current sensor senses current flow at a point between switch 82 and second terminal 88. In a version of this embodiment, a primary of a first potential transformer is connected to first terminal 86 and second terminal 88 to decrease the voltage level supplied to the multiphase control module 222. The outputs of the current sensors and the voltage sensors can be supplied to the main control module 58 for processing, display at the user interface 60, and communication to remote systems via the communication module 64 shown in FIG. 1.

Figure 6:
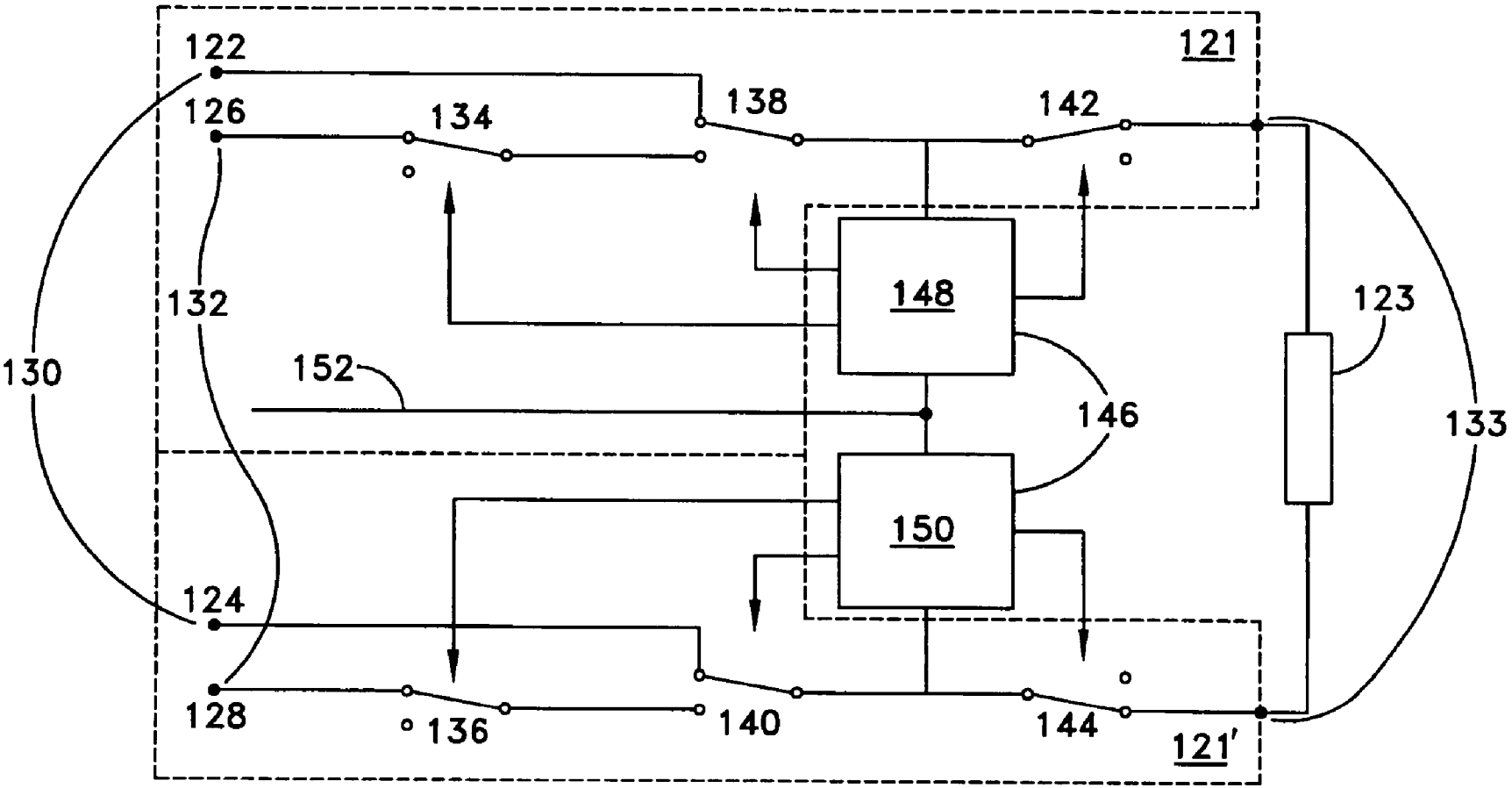
FIG. 6 is a schematic diagram of switch connections in another embodiment of a transfer switch according to the invention.
Figure 7:
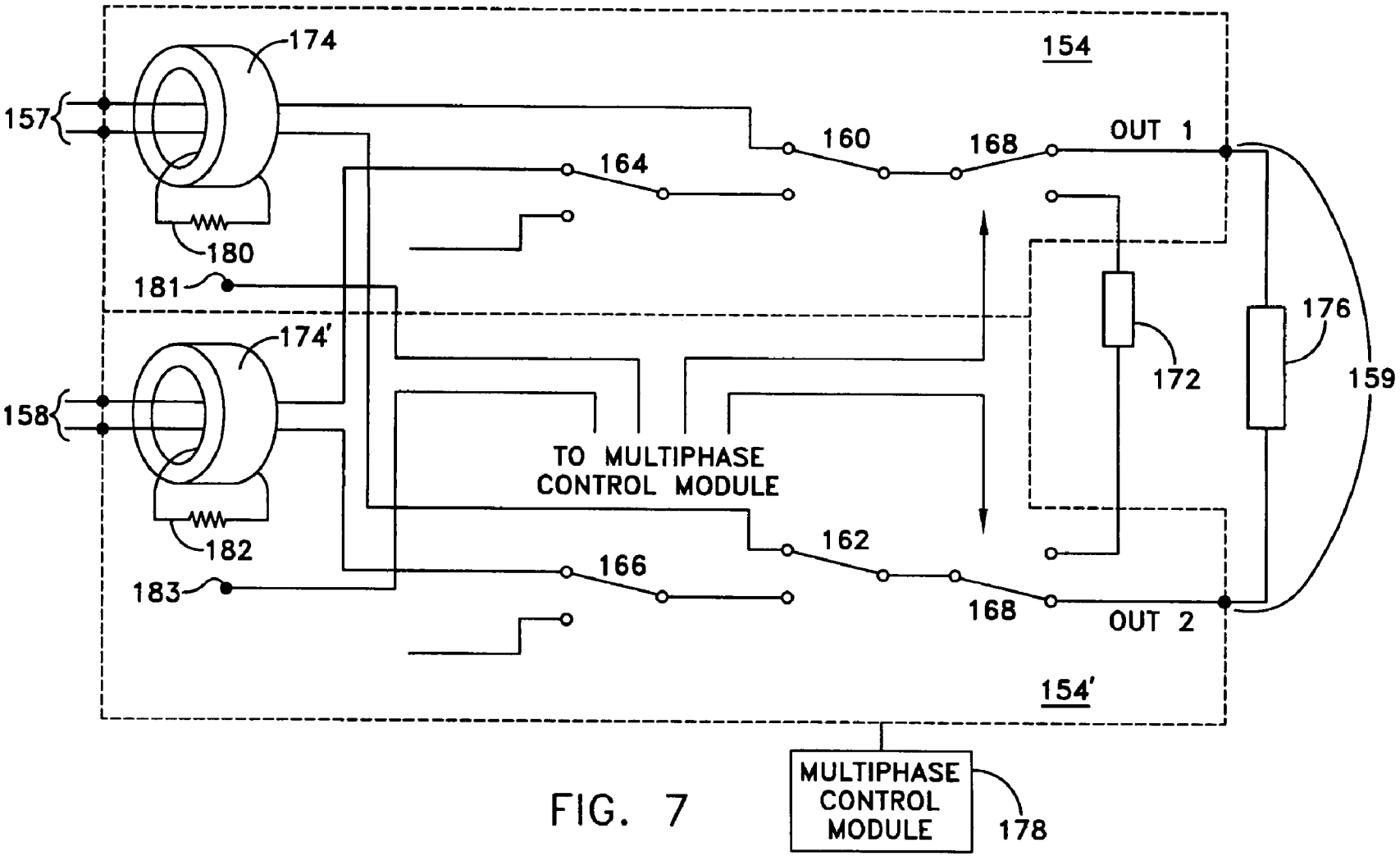
FIG. 7 is a schematic diagram of switch connections in a further embodiment of a transfer switch according to the invention.
Figure 8:
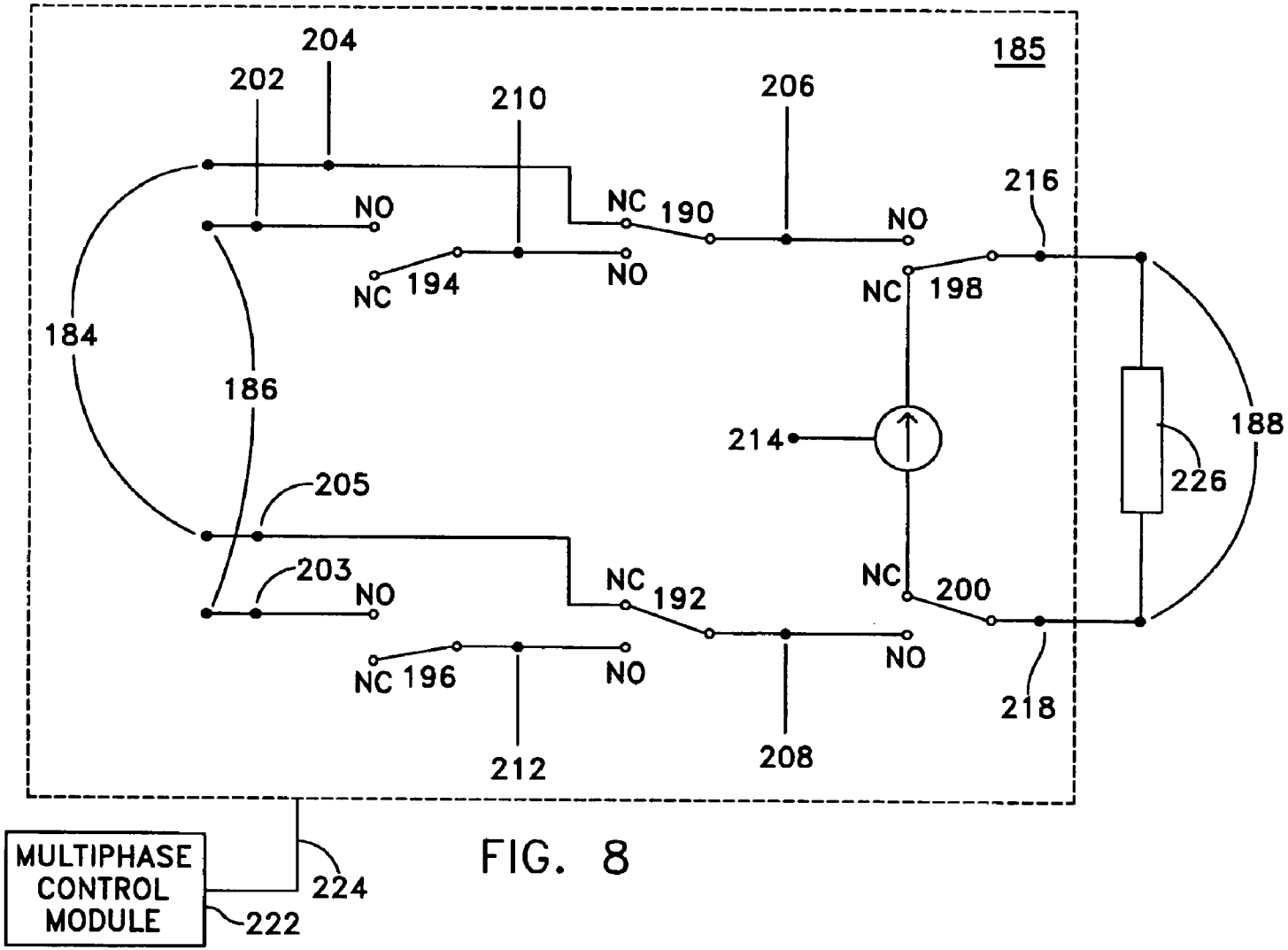
FIG. 8 is a schematic diagram of switch connections in yet another embodiment of a transfer switch according to the invention.

FIGS. 6, 7 and 8 depict alternative embodiments of multiphase switching modules. Each of the switching modules shown in FIGS. 6, 7 and 8 can be employed in a transfer switch, for example, the transfer switch 20 shown in FIG. 1, in place of multiphase switching modules 54, 54'.

In FIG. 6, switching modules 121, 121' are employed to control a two phase electric supply to a load 123. A primary source of power is connected to a primary input 130 and an alternate source of power is connected to an alternate input 132. The switching modules 121, 121' also provide an output 133. The primary input 130 includes a first terminal 122 and a second terminal 124 to connect a first phase and a second phase of the primary source of power to the multiphase switching modules 121, 121', respectively. The alternate input 132 includes a first terminal 126 and a second terminal 128 to connect a first phase and a second phase of the alternate source of power to the multiphase switching modules 121, 121'. In the embodiment shown in FIG. 6, switches 134, 136, 138, 140, 142, 144 are included in the multiphase switching modules 121, 121'. In another embodiment, however, the switches 134, 136, 138, 140, 142, 144 are included in a single multiphase switching module. The approach shown in FIG. 6 is scalable, so that in yet another embodiment a multiphase switching module is included to control a third phase of a three phase electric supply. In one embodiment, switches 134 and 136 are employed to isolate the alternate input 132 from the remainder of the circuitry. The switches of one or more switching modules form sets of switches where each set is used to switch all phases of a specific input or output. In FIG. 6, for example, switches 134, 136 form a first set of switches that switch the alternate input 132, switches 138, 140 form a second set of switches that switch the primary input 130, and switches 142, 144 form a third set switches that switch the output 133. Each set of switches in FIG. 6 include a pair of switches, however, each set may include three or more switches depending upon the requirements of the application, e.g., the quantity of line conductors provided by the power sources.

The embodiment of FIG. 6 also includes a multiphase control module 146. The multiphase control module 146 includes a first module 148 for sensing and control of a first phase and a second module 150 for sensing and control of a second phase. In alternative embodiments, the multiphase control module 146 may be a single module as shown for the embodiment in FIG. 1. A neutral conductor 152 is also connected to multiphase control module 146. As described above concerning the multiphase control modules 70, 70' in FIG. 2, the multiphase control module 146 of FIG. 6 includes sensing inputs and switching outputs to ensure that a backfeed between the primary source and the alternate source does not occur at any time, even if one or more of the switches 134, 136, 138, 140, 142 and 144 malfunction. For example, the sensing and control logic of the multiphase control module 146 prevent a backfeed that can result when a switch becomes inoperative as a result of a welded contact. In one embodiment, the approach employed in the control of the multiphase switching modules 121, 121' is generally the same as that previously described for switching modules 70, 70'. Switching modules 121, 121' include sensing nodes that provide signals to the multiphase control module 146 that allow the control module 146 to detect one or more inoperative switches among switches 134, 136, 138, 140, 142 and 144 and control switch operation to prevent a connection between the primary input 130 and the secondary input 132.

The configuration of switches 134, 136, 138, 140, 142 and 144 in the embodiment shown in FIG. 6 does differ from the configuration of switches 72, 74, 76, 78, 80 and 82 in the embodiment shown in FIG. 2. For example, in FIG. 6, the switches 138, 140 used to switch the primary input 130 have a terminal connected to the primary input 130 and a terminal connected to the switches 134, 136 used to switch the alternate input 132, i.e., switch 134 is connected to switch 138 and switch 136 is connected to switch 140. Conversely, in the embodiment shown in FIG. 2, the switches 72, 74 used to switch the primary input 91 are not connected to the switches 76, 78 used to switch the alternate input 93. Instead, in the embodiment shown in FIG. 2, switches 80, 82 selectively connect the output 84 to either switches 72, 74, or switches 76, 78.

In FIG. 7, a further embodiment of multiphase switching modules 154, 154', which can be used in place of the multiphase switching modules 54, 54' of FIG. 1 in the transfer switch 20, is shown. The multiphase switching modules 154, 154' include a primary input 157, an alternate input 158 and an output 159. The multiphase switching modules 154, 154' include a set of switches 160, 162 to switch the primary input 157, a set of switches 164, 166 to switch the alternate input 158, and a set of switches 168, 170 to switch the output 159. Switches 160, 164 and 168 are included in a first multiphase switching module 154, and switches 162, 166 and 170 are included in a second multiphase switching module 154'. The switch configuration of the embodiment shown in FIG. 7 is the same as the switch configuration shown in FIG. 6, however, the embodiment of FIG. 7 differs from the embodiment shown in FIG. 6. As one example, the multiphase switching modules 154, 154' may be connected to a test load 172. In one version, the test load 172 is located external to the transfer switch 20. In another version, the test load 172 is included within the transfer switch 20. In addition, multiphase switching modules 154, 154' employ current sensors 174, 174' to detect current flow resulting from a malfunction of any of the switches 160, 162, 164, 166, 168, 170 employed to control the two phase electric supply to a load 176. In one embodiment, the current sensors 174, 174' are a torodial style current transformer, for example, part number L12003 manufactured by Falco Electronics.

In the embodiment shown in FIG. 7, a multiphase control module 178 employs logic to prevent a backfeed between any phase of the primary input 157 and any phase of the alternate input 158, however, the logic differs from that described regarding FIG. 6 because in addition to teachings described above, current sensing may be used with the embodiment of FIG. 7 to detect a malfunction of the switches 168, 170. For example, when the connection to the output 159 is transferred from the primary input 157 to the alternate input 158, switches 168, 170 operate to disconnect the load and connect the test load 172 to the primary input 157. Switches 160, 162, 164, 166 are then switched to connect the alternate input 158 to the test load 172. Provided that there are no inoperative switches, there is no current flow in the current transformer secondaries 180, 182 during these switching operations. More specifically, in one embodiment, switches 160, 162 are switched to the position that connects them to switches 164, 166, respectively. The switches 164, 166 are switched to the position that connects alternate input 158 to switches 160, 162. If the primary input 157 is connected to the alternate input 158 during the preceding switching operations, for example, as a result of a switch malfunction, any current flowing from an input 157, 158 does not have a return path that is sensed by the corresponding current transformer. As a result, provided that at least one of the primary input 157 and the alternate input 158 are energized, current flows in the corresponding current transformer secondary 180 or 182. The corresponding current transformer output 181, 183 then provides a signal to drive an input of the multiphase control module 178. The multiphase control module 178 provides a fault indication and, in one embodiment, prevents any subsequent switch operation until a user resets the fault indication (e.g., after investigating and clearing the fault condition, for example, replacing a failed switch). If there are no switch malfunctions, however, switches 168, 170 are operated to connect the output 159 to the alternate input 158. Again, provided that there are no inoperative switches, there should be no current flow in the current transformer secondaries 180, 182.

In one embodiment, the current drawn by the test load 172 is sufficiently small that it is not considered a hazard if a backfeed between the primary input 157 and the alternate input 158 is created through the test load 172. In one embodiment, a current is considered non-hazardous if it is less than 3.5 milliamperes. In another embodiment, a lower voltage source (e.g., a DC source or an AC source supplied from a step-down transformer) is connected to the unused terminal of each of switches 164, 166 to provide a means of providing a low power test current.

FIG. 8 shows a single multiphase switching module 185 which can be employed, for example, in the transfer switch 20 shown in FIG. 1 in place of both the multiphase switching modules 54, 54'. The embodiment of FIG. 8 includes a primary input 184, an alternate input 186, an output 188, switches 190, 192, 194, 196, 198, 200, and sensing nodes 202, 204, 206, 208, 210, 212, 214, 216, 218. The switch configuration of the embodiment shown in FIG. 8 is similar to the switch configuration show in FIG. 7, however, in FIG. 8 the test load 172 of FIG. 7 is replaced with a current source 220. In addition, current sensors are not included at the primary input and the secondary input in the embodiment shown in FIG. 8. In one embodiment (described below), however, current sensing is employed to determine the status of switches 198, 200, in particular, sensing current flow from the current source 220.

In one embodiment, each of the sensing nodes 202, 204, 206, 208, 210, 212, 214, 216, 218 is connected to a multiphase control module 222 over communication bus 224. As previously described with reference to FIG. 2, switch control signals (not shown) control operation of the switches 190, 192, 194, 196, 198, 200. In one embodiment, the switch control signals are provided to the multiphase switching module 185 by the multiphase control module 222 over the communication bus 224. Logic for the switching module 185 is implemented in a fashion very similar to that described for one embodiment of the multiphase switching modules 70, 70' of FIG. 2. For example, in one embodiment, the status of switches 190, 192, 194 and 196 is determined by voltage sensing. The status of switches 198, 200 connected to the output 188, however, is determined by the current flow in the circuit created by the current source 220, switches 198, 200 in their normally closed (NC) position, and a load 226 connected to the output 188. Thus, during normal operation, current from the current source 220 flows through the load 226 and the switches 198, 200 when the output 188 is isolated from the switches 190, 192.

In the embodiment shown in FIG. 8, with the switches 198, 200 in their normally open (NO) position, the transfer from the first input 184 to the second input 186 begins when the switches 198, 200 are disconnected from the load 226 and connected to the current source 220. If the switches 198, 200 operate properly, current flows from the current source 220 through the load 226. The presence of current is determined when logic associated with sensing node 214 provides a HI signal indicating that switches 198, 200 are in their normally closed position. The multiphase control module 222 detects a malfunction of at least one of switches 198 and 200 when sensing node 214 provides a logic LO signal indicating that current is not flowing as expected. The multiphase control module 222 provides a fault indication and, in one embodiment, prevents any subsequent switch operation until a user resets the fault indication (e.g., after investigating and clearing the fault condition, for example, replacing a failed switch). If switches 198, 200 operate as expected, the switches 190, 192 are switched to their normally open (NO) position. The switches 194, 196 are switched to their normally open (NO) position. Voltage sensing at sensing nodes 210, 212 is used to determine whether switches 194 and 196 have operated properly. In one embodiment, the presence of voltage at sensing nodes 210, 212 indicates that he switches 194, 196 operated properly. The switches 198, 200 are then switched to their normally open (NO) position to connect the alternate input 186 to the output 188. If the switches 198, 200 operated properly, the logic associated with sensing node 214 transitions to a LO signal indicating that current from current source 220 is no longer flowing through switches 198, 200.

In one embodiment, multiphase switching module 185 includes two multiphase switching modules (as shown in the previous embodiments) with the current source 220 located external to each switching module.

Several aspects of at least one embodiment of this invention have been described herein with reference to 240 volt systems. The embodiments described herein, however, may also be employed with a wide range of systems including three phase systems and systems operating at voltages such as, for example, 480 volt systems. Further, the embodiments of the invention may be employed in AC and DC systems including AC systems operating at 50 Hz, 60 Hz or other frequencies.

Embodiments of transfer switch 20 described herein can also be configured to selectively switch between three or more multiphase sources of power, for example, a primary power source, a first alternate power source, and a second alternate power source. In these embodiments, the multiphase switching modules (e.g., 70, 70') are configured to switch between the multiple sources, i.e., the embodiments described herein are scalable. In versions of these embodiments, the transfer switch complies with UL 1008 and prevents a backfeed even when only a single switch fails.

Further, embodiments of the invention including those described herein may be employed in a variety of transfer switches. For example, embodiments of the invention may be employed in an automatic transfer switch that switches between a primary source and an alternate source without user intervention. Versions of these embodiments may also provide a start signal to automatically start a generator. Embodiments of the invention may also be employed in transfer switches that switch between a primary power source and an alternate power source when instructed to do so by a user. In these embodiments, the multiphase control module can employ logic as described herein to prevent a backfeed between two or more sources of power.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A transfer switch comprising:

a first input to couple a first multiphase low voltage electrical supply to the transfer switch;

a first set of switches in electrical communication with the first input;

a second input to couple a second multiphase low voltage electrical supply to the transfer switch;

a second set of switches in electrical communication with the second input;

an output to couple the transfer switch to a load;

a third set of switches coupled in series between the second set of switches and the output; and a control module to monitor and control operation of the first set of switches, the second set of switches and the third set of switches to selectively couple the first input and the second input to the output and to detect a malfunction of any switches included in at least one of the first set of switches, the second set of switches and the third set of switches and to prevent the first input from being placed in electrical communication with the second input, wherein the second set of switches are coupled in series between the first set of switches and the third set of switches.

2. The transfer switch as claimed in claim 1, further comprising a switching module comprising:

a switch included in the first set of switches;

a switch included in the second set of switches; and a switch included in the third set of switches.

3. The transfer switch as claimed in claim 2, wherein the switching module further comprises:

each switch included in the first set of switches;

each switch included in the second set of switches; and each switch included in the third set of switches.

4. The transfer switch as claimed in claim 2, further comprising a plurality of switching modules.

5. The transfer switch as claimed in claim 1, wherein the first input is adapted to couple to a first split-phase electrical supply, and wherein the second input is adapted to couple to a second split-phase electrical supply.

6. The transfer switch as claimed in claim 5, wherein the first input is adapted to couple to a first 240 volt split-phase electrical supply, and wherein the second input is adapted to couple to a second 240 volt split-phase electrical supply.

7. The transfer switch as claimed in claim 6, wherein at least one of the first input and the second input is adapted to couple to a power source selected from a group consisting of a generator, an uninterruptible power supply and an alternative energy source.

8. The transfer switch as claimed in claim 1, wherein the first set of switches comprises a first pair of switches and the second set of switches comprises a second pair of switches.

9. The transfer switch as claimed in claim 8, the first set of switches further comprising two single pole double throw switches, and the second set of switches further comprising two single pole double throw switches.

10. The transfer switch as claimed in claim 9, the first set of switches further comprising a first relay comprising at least one single pole double throw switch; and the second set of switches further comprising a second relay comprising at least one single pole double throw switch.

11. The transfer switch as claimed in claim 8, wherein the first pair of switches comprises a first switch and a second switch, wherein the control module is coupled to a load side of the first switch to receive a first control signal, wherein the control module is coupled to a load side of the second switch to receive a second control signal, and wherein the control module is adapted to detect a malfunction of the first set of switches by a state of at least one of the first control signal and the second control signal.

12. The transfer switch as claimed in claim 11, wherein the second pair of switches comprises a first switch and a second switch, wherein the control module is coupled to a load side of the first switch of the second pair of switches to receive a third control signal, wherein the control module is coupled to a load side of the second switch of the second pair of switches to receive a fourth control signal, and wherein the control module is adapted to detect a malfunction of the second set of switches by a state of at least one of the third control signal and the fourth control signal.

13. The transfer switch as claimed in claim 1, wherein a malfunction of the third set of switches is sensed by a presence of voltage at the output.

14. The transfer switch as claimed in claim 1, wherein a malfunction of the third set of switches is sensed by current flow through any of the switches comprising the third set of switches.

15. The transfer switch as claimed in claim 1, wherein the malfunction includes a welded contact.

16. The transfer switch as claimed in claim 1, wherein the third set of switches are operable in at least a first position and a second position, wherein the second set of switches are coupled to the output when the third set of switches are located in the first position, and wherein the second set of switches are coupled to a test load when the third set of switches are located in the second position.

17. The transfer switch as claimed in claim 1, wherein the third set of switches are operable in at least a first position and a second position, wherein the second set of switches are coupled to the output when the third set of switches are located in the first position, wherein the second set of switches are disconnected from the output when the third set of switches are located in the second position, and wherein the output is coupled to a current source when the third set of switches are located in the second position.

18. The transfer switch as claimed in claim 1, wherein the second set of switches are operable in at least a first position and a second position, wherein the first set of switches are electrically isolated from the third set of switches by the second set of switches when the second set of switches are located in the first position, and wherein the first set of switches are placed in electrical communication with the third set of switches by the second set of switches when the second set of switches are located in the second position.

19. A method of preventing a backfeed through a transfer switch, the transfer switch comprising a first input coupled to a first switch and adapted to receive a first multiphase low voltage power from a first power source, a second input coupled to a second switch and adapted to receive a second multiphase low voltage power from a second power source, an output and a third switch coupled to the output, the method comprising:

connecting the first input to the output at least in part by operating the second switch to connect the first switch to the third switch;

initiating a transfer to disconnect the output from the first input and connect the output to the second input at least in part by operating the second switch to connect the second input to the third switch;

operating a plurality of sets of switches to complete the transfer;

monitoring at least one of the plurality of sets of switches to detect a malfunction of any switches; and stopping the transfer if a malfunction is detected to prevent the first input from being placed in electrical communication with the second input.

20. The method of claim 19, wherein the act of initiating comprises an act of detecting a voltage decrease at the first input.

21. The method of claim 19, wherein the act of monitoring comprises an act of voltage sensing.

22. The method of claim 21, further comprising acts of:

sensing whether the first switch is operative by sensing a voltage at a load side of the first switch;

sensing whether the second switch is operative by sensing a voltage at a load side of the second switch; and sensing whether the third switch is operative by sensing a voltage at a load side of the third switch.

23. The method of claim 22, wherein each of the acts of sensing further comprise an act of detecting a welded contact by the presence of a voltage.

24. The method of claim 19, further comprising an act of sensing whether a switch is in a position that is inconsistent with a state established for the switch by control logic.

25. The method of claim 19, wherein the first input is adapted to couple to a first split-phase low voltage power source and the second input is adapted to couple to a second split-phase low voltage power source.

26. The method of claim 19, wherein each of the plurality of sets of switches comprises a pair of switches.

27. The method of claim 19, further comprising an act of sensing that a switch connected to the output is inoperative when a current is flowing through the switch connected to the output.

28. A transfer switch comprising:

a first input to couple a first multiphase low voltage electrical power supply to the transfer switch;

a first set of switches in electrical communication with the first input;

a second input to couple a second multiphase low voltage electrical power supply to the transfer switch;

a second set of switches in electrical communication with the second input;

an output to couple the transfer switch to a load;

a third set of switches coupled in series between the second set of switches and the output; and means for detecting a malfunction in any of the first set of switches, the second set of switches and the third set of switches, and upon detecting a malfunction, preventing a connection of at least one of the first input and the second input to the output, wherein the second set of switches are coupled in series between the first set of switches and the third set of switches.

29. The transfer switch as claimed in claim 28, further comprising a switching module comprising:

a switch included in the first set of switches;

a switch included in the second set of switches; and a switch included in the third set of switches.

30. The transfer switch as claimed in claim 29, further comprising a plurality of switching modules.

31. The transfer switch as claimed in claim 28, wherein the means for detecting a malfunction detects a malfunction of a switch in the first set of switches when a voltage is present on a load side of the switch.

32. The transfer switch as claimed in claim 28, wherein the means for detecting a malfunction detects a malfunction of a switch in the second set of switches when a voltage is present on a load side of the switch.

33. The transfer switch as claimed in claim 28, wherein the first input is adapted to couple to a first split-phase low voltage power supply and the second input is adapted to couple to a second split-phase low voltage power supply.

34. The transfer switch as claimed in claim 33, wherein the first input is adapted to couple to a first 240 volt split-phase power supply and the second input is adapted to couple to a second 240 volt split-phase power supply.

35. The transfer switch as claimed in claim 28, wherein the second input is adapted to couple to a power supply selected from a group consisting of a utility source, a generator, an uninterruptible power supply and an alternative energy source.

36. The transfer switch as claimed in claim 28, wherein, upon detecting a malfunction, the means for detecting a malfunction generate a fault indication.

37. The transfer switch as claimed in claim 28, wherein each of the first set of switches and the second set of switches comprises a pair of switches.

*38. A transfer switch comprising:*

*a first input to couple to a first power source;*

*a second input to couple to a second power source;*

*an output to provide output power;*

*a first switching module coupled to the first input, the second input and the output and configured to selectively couple one of the first input and the second input with the output;*

*a second switching module coupled to the first input, the second input and the output and configured to selectively couple one of the first input and the second input with the output;*

*an interface configured to allow a user to select a single phase configuration or a multiphase configuration for each of the first switching module and the second switching module; and*

*a control device coupled to the interface and the first switching module and the second switching module and configured to prevent the first input from being placed in electrical communication with the second input for the multiphase configuration of either the first switching module or the second switching module.*

*39. The transfer switch of claim 38, wherein the control device is configured to detect a loss of power at the first input and to control each of the first switching module and the second switching module to disconnect the output from the first input and connect the output to the second input while isolating the first input from the second input.*

*40. The transfer switch of claim 39, wherein the output includes a first output line and a second output line and wherein the first switching module is coupled to the first output line and the second switching module is coupled to the second output line.*

*41. The transfer switch of claim 38, wherein each of the first input and the second input includes a first line and a second line, and in the multiphase configuration, the first line of the first input and the first line of the second input are coupled to the first switching module and the second line of the first input and the second line of the second input are coupled to the second switching module.*

*42. The transfer switch of claim 41, further comprising a third input, a fourth input and a second output and a third switching module coupled to the third input, the fourth input and the second output and configured to selectively couple one of the third input and the fourth input with the second output.*

*43. The transfer switch of claim 38, wherein the first switching module has at least one switch, and wherein the control device is configured to detect a failure of the at least one switch.*

*44. A method of switching multiple power sources to a load using a transfer switch having at least a first switching module and a second switching module, the method comprising:*

*coupling a first power source to the first switching module and to the second switching module;*

*coupling a second power source to the first switching module and to the second switching module;*

*configuring a user interface of the transfer switch to allow a user to select between a single phase mode of operation and a multiphase mode of operation for each of the first switching module and the second switching module;*

*monitoring at least one of the first switching module and the second switching module to detect a malfunction within the at least one of the first switching module and the second switching module; and*

*preventing a transfer of power from the first power source to the second power source upon detection of a malfunction.*

*45. The method of claim 44, further comprising coupling a first load to an output of the first switching module and to an output of the second switching module and providing 240 volt AC power to the first load.*

*46. The method of claim 45, further comprising coupling a third power source to a third switching module of the transfer switch.*

*47. The method of claim 46, further comprising coupling a second load to an output of the third switching module and providing 120 volt single phase power to the second load.*

*48. The method of claim 44, further comprising selecting a single phase mode of operation for each of the first switching module and the second switching module, and coupling a first load to the first switching module and coupling a second load to the second switching module and providing 120 volt single phase power to the first load and to the second load.*

*49. The method of claim 44, wherein:*

*the first power source and the second power source are split-phase power sources;*

*coupling a first power source to the first switching module and to the second switching module includes coupling*

*the first switching module to a first phase line of the first power source and coupling the second switching module to a second phase line of the first power source; and*

*coupling a second power source to the first switching module and to the second switching module includes coupling the first switching module to a first phase line of the second power source and coupling the second switching module to a second phase line of the second power source.*

*50. A transfer switch comprising:*

*a first input to couple to a first power source;*

*a second input to couple to a second power source;*

*an output to provide output power;*

*a first switching module coupled to the first input, the second input and the output and configured to selectively couple one of the first input and the second input with the output;*

*a second switching module coupled to the first input, the second input and the output and configured to selectively couple one of the first input and the second input with the output;*

*means tor selecting a single phase configuration or a multiphase configuration for each of the first switching module and the second switching module and means for preventing the first input from being placed in electrical communication with the second input for the multiphase configuration.*

*51. The transfer switch of claim 50, further comprising means for detecting a loss of power at the first input and for controlling each of the first switching module and the second switching module to disconnect the output from the first input and connect the output to the second input while isolating the first input from the second input.*

*52. The transfer switch of claim 50, wherein the output includes a first output line and a second output line and wherein the first switching module is coupled to the first output line and the second switching module is coupled to the second output line.*

*53. The transfer switch of claim 50, wherein each of the first input and the second input includes a first line and a second line, and in the multiphase configuration, the first line of the first input and the first line of the second input are coupled to the first switching module and the second line of the first input and the second line of the second input are coupled to the second switching module.*

*54. The transfer switch of claim 53, further comprising a third input, a fourth input and a second output and a third switching module coupled to the third input, the fourth input and the second output and configured to selectively couple one of the third input and the fourth input with the second output.*

*55. The transfer switch of claim 50, wherein the first switching module has at least one switch, and wherein the transfer switch further includes means for detecting a failure of the at least one switch.*

* * * * *